United States Patent [19]

Ma et al.

[11] Patent Number: 4,490,302
[45] Date of Patent: Dec. 25, 1984

[54] LIQUID DIPHENYLMETHANE DIISOCYANATE COMPOSITIONS

[75] Inventors: Eric C. Ma, New Martinsville; James N. Rieck, Wheeling, both of W. Va.

[73] Assignee: Mobay Chemical Corporation, Pittsburgh, Pa.

[21] Appl. No.: 554,880

[22] Filed: Nov. 25, 1983

[51] Int. Cl.$^3$ .................. C07C 69/00; C07C 125/06
[52] U.S. Cl. .................. 260/453 AM; 260/453 SP; 560/26; 560/27; 521/155; 521/159
[58] Field of Search ............... 260/453 AM, 453 SP; 560/26, 27

[56] References Cited

U.S. PATENT DOCUMENTS

| | | | |
|---|---|---|---|
| 3,152,162 | 10/1964 | Fischer et al. | 260/453 |
| 3,384,653 | 5/1968 | Erner et al. | 260/453 |
| 3,394,165 | 7/1968 | McClellan et al. | 260/453 |
| 3,449,256 | 6/1959 | Farrisey et al. | 252/182 |
| 3,640,966 | 2/1972 | Hennig et al. | 360/77.5 R |
| 3,641,093 | 2/1972 | Brooks et al. | 260/453 R |
| 3,644,457 | 2/1972 | König et al. | 260/453 AP |
| 3,674,828 | 7/1972 | Brooks et al. | 260/453 P |
| 3,701,796 | 10/1972 | Laaty et al. | 260/453 P |
| 3,883,571 | 5/1975 | Allport et al. | 260/453 AM |
| 4,014,935 | 3/1977 | Ibbotson | 260/566 R |
| 4,031,026 | 6/1977 | Ibbotson | 252/182 |
| 4,055,548 | 10/1977 | Carleton et al. | 260/77.5 AT |
| 4,088,665 | 5/1978 | Fendeisen et al. | 260/453 AM |
| 4,102,833 | 7/1978 | Salisbury | 521/159 |
| 4,115,429 | 9/1978 | Reiff et al. | 260/453 SP |
| 4,118,411 | 10/1978 | Reiff et al. | 260/453 SP |
| 4,154,752 | 5/1979 | Sundermann et al. | 260/453 SP |
| 4,177,205 | 12/1979 | Schaaf et al. | 260/453 AM |
| 4,229,347 | 10/1980 | Halt et al. | 260/239 A |
| 4,261,852 | 4/1981 | Carroll et al. | 528/59 |
| 4,321,333 | 3/1982 | Alberino et al. | 521/159 |
| 4,332,742 | 6/1982 | Allen | 260/453 SP |

*Primary Examiner*—Alan Siegel
*Attorney, Agent, or Firm*—Gene Harsh; Joseph C. Gil

[57] ABSTRACT

The present invention is directed to a liquid, diphenylmethane diisocyanate composition having an isocyanate functionality of greater than 2.0 and having an isocyanate group content of from about 20 to about 30 percent by weight prepared by reacting:
 (a) diphenylmethane diisocyanate with
 (b) a mixture of
  (i) from about 5 to about 20 equivalent percent of a monohydroxy alcohol,
  (ii) from about 25 to about 35 equivalent percent of a poly-1,2-propylene ether glycol having a molecular weight of from 134 to 700, and
  (iii) from about 45 to about 65 equivalent percent of a trihydroxy alcohol selected from the group consisting of trimethylolpropane, triethylolpropane, glycerin and 1,3,6-hexane triol,
the total equivalent percent of (i), (ii) and (iii) being 100,
the weight ratio of (a) to (b) being from 5:1 to 15:1.

7 Claims, No Drawings

LIQUID DIPHENYLMETHANE DIISOCYANATE COMPOSITIONS

BACKGROUND OF THE INVENTION

Diisocyanates which are liquid at room temperature have numerous advantages over solid diisocyanates. Diisocyanates which are liquid at room temperature, such as toluene diisocyanate or hexamethylene diisocyanate, are, as a rule, physiologically harmful because of their high vapor pressure. For this reason, various attempts have been made to start with diisocyanates that are solid at room temperature and convert these into the liquid form by certain measures.

The most commercially important diisocyanates which are solid at room temperature are 4,4'-diphenylmethane diisocyanate and the 2,4'-isomer thereof, which melt at 39° C. and 34.5° C., respectively.

Numerous patents have issued relating to the liquification of diphenylmethane diisocyanate. See, for example, U.S. Pat. Nos. 3,152,162; 3,384,653; 3,394,165; 3,449,256; 3,640,966; 3,641,093; 3,674,828; 3,701,796; 3,883,571; 4,014,935; 4,055,548; 4,088,665; 4,031,026; 4,102,833; 4,115,429; 4,118,411; 4,154,752; 4,177,205; 4,229,347; 4,261,852; 4,321,333; and 4,332,742.

One of the more commercially successful liquid diphenylmethane diisocyanate compositions is produced according to U.S. Pat. No. 3,644,457. These isocyanates are prepared by reacting 4,4'- and/or 2,4'-diphenylmethane diisocyanate with a branched aliphatic dihydroxy compound to produce a product which is liquid at room temperature. According to this patent, 1 mol of a diphenylmethane diisocyanate is reacted with from about 0.1 to about 0.3 mols of a poly-1,2-propylene ether glycol having a molecular weight of from 134 to 700.

Although the isocyanates made according to U.S. Pat. No. 3,644,457 have met with significant commercial success, such isocyanates are generally linear in structure (i.e., having NCO functionalities of 2). For many applications, it would be desirable to provide liquid diphenylmethane diisocyanate compositions having some branching (i.e., having NCO functionalities of greater than 2). Additionally, for some applications it would be desirable to incorporate some unsaturation in the isocyanate composition.

It is an object of the present invention to provide improved organic isocyanates which are liquid at room temperature and which remain liquid even on prolonged storage down to 15° C. Another object of this invention is to provide an improved process for preparing such liquid organic isocyanates. Finally, it is an object of this invention to provide a liquid isocyanate which has some branching and which may have some incorporated unsaturation.

DESCRIPTION OF THE INVENTION

The present invention is directed to a liquid, diphenylmethane diisocyanate having an isocyanate functionality of greater than 2 (and generally less than 2.20) and an isocyanate group content of from about 20 to about 30 percent by weight, prepared by reacting
(a) diphenylmethane diisocyanate, with
(b) a mixture of
  (i) from about 5 to about 20 equivalent percent of a monohydroxy alcohol,
  (ii) from about 25 to about 35 equivalent percent of a poly-1,2-propylene ether glycol having a molecular weight of from 134 to 700, and
  (iii) from about 45 to about 65 equivalent percent of a trihydroxy alcohol selected from the group consisting of trimethylolpropane, triethylolpropane, glycerine, and 1,3,6-hexane triol,
the total equivalent percent of (i), (ii) and (iii) being 100, and wherein the weight ratio of (a) to (b) is from 5:1 to 15:1.

In general, the components are reacted at a temperature of from about 40° C. to about 90° C., preferably from 40° C. to about 75° C., and most preferably from about 50° C. to about 70° C. The preferred isocyanate group content is from about 20 percent to about 25 percent by weight, while the preferred weight ratio of component (a) to component (b) is from about 6:1 to about 10:1.

The liquid modified diphenylmethane diisocyanate may also be prepared as a concentrate (that is, with a lower percent isocyanate group content) and diluted with additional diphenylmethane diisocyanate to adjust the isocyanate content to the desired level.

The present invention is also directed to a process for producing the above-noted isocyanate compositions by reacting the diphenylmethane diisocyanate with the mixture noted above. As used herein the term "diphenylmethane diisocyanate" is defined as 2,2'-diphenylmethane diisocyanate, 2,4'-diphenylmethane diisocyanate, 4,4'-diphenylmethane diisocyanate and mixtures thereof.

The liquid isocyanates which can be prepared according to the invention preferably from 4,4'- and/or 2,4'-diphenylmethane diisocyanate, have a low viscosity and can therefore be processed very easily. Additionally, they have a very low vapor pressure and are, therefore, less physiologically harmful. In addition, the resultant products can be used in the reaction injection molding (RIM) process, in shoe sole formulations, in adhesives and in zinc coatings to yield better overall properties in the resultant polyurethane and/or polyurea product. In the RIM process, improved green strength of the molded product is achieved using the isocyanates of the present invention.

In general, the process may be carried out by introducing the mixture of components containing isocyanate-active hydrogen groups into the isocyanate at temperatures of from about 40° to about 90° C., with stirring. The isocyanate content of the product of the process amounts to from about 20 to about 30 percent, by weight, and preferably to from about 20 to about 25 percent, by weight.

Suitable monohydroxy alcohols include substantially any saturated or unsaturated monohydroxy alcohol. Such alcohols preferably have molecular weights of from 32 to 270 and include aliphatic, unsaturated aliphatic, substituted aliphatic, aromatic, alicyclic and heterocyclic alcohols. They may be primary, secondary or tertiary alcohols. Examples of n-propyl, isopropyl, n-butyl, isobutyl, sec-butyl, tert-butyl, n-pentyl, isopentyl, tert-amyl, sec-amyl, diethylcarbinol, d-amyl, n-hexyl, n-heptyl, 2-heptyl, 4-heptyl (4-heptanol), n-octyl, sec-n-octyl, n-nonyl, n-decyl, n-undecyl, lauryl, myristyl, cetyl and stearyl alcohol. Additionally, vinyl, allyl, propargyl(2-propyn-1-ol), crotyl, oleyl, benzyl, α-phenylethyl, β-phenylethyl, phenylpropyl(3-phenyl-1-propanol), α-methylbenzyl, cinnamyl, anisyl, furfuryl and tetrahydrofurfuryl alcohols may be used. Further examples of suitable alcohols include citronellol, geraniol, linaloöl, cyclopentanol, cyclohexanol, menthol, -terpineol, borneol, benzohydrol, triphenyl-carbinol, 4-methyl-2-pentanol, 2-ethyl-1-butanol, 2-octanol, 2-ethyl-1-hexanol, 1-decanol, 5-ethyl-2-nonanol, 1-dodecanol, 1-tetradecanol, 7-ethyl-2-methyl-4-undecanol, 1-hexadecanol, 3,9-diethyl-6-tridecanol and 2-hydroxy ethylmethacrylate.

The presently preferred monohydroxy alcohols are cinnamyl alcohol; 3-phenyl-1-propanol; 4-heptanol; propargyl alcohol; 2-hydroxy ethyl methacrylate; and tert-butanol.

The poly-1,2-propylene ether glycols useful herein include dipropylene glycol, tripropylene glycol and higher propylene glycols, with tripropylene glycol being presently preferred.

The presently preferred trihydroxy alcohol is trimethylol propane.

As noted above, the amounts of mono-alcohol, poly-1,2-propylene ether glycol and trihydroxy alcohol are within certain specified ranges. The various equivalent percents can be readily determined by first equivalent percents can be readily determined by first adding the total hydroxy equivalents in the mixture. The hydroxyl equivalents represented by any one component of the mixture can then be divided by the total equivalent to arrive at an equivalent percent for the mixture.

The products of the present invention can be used for many different polyaddition reactions in the lacquer and plastics industry. For example, they may be used in the products of polyurethane foams and elastomers, such as in reaction injection molding (RIM) products, shoe soles, adhesives and coatings, to give better physical properties, especially green strength, when compared to known modified diphenylmethane diisocyanates.

The invention is further illustrated, but is not intended to be limited by the following examples in which all parts and percentages are by weight unless otherwise specified.

EXAMPLES 1–11

In each of Examples 1–9, trimethylol propane (TMP) was dissolved, over a one-to-one-and-one-half hour period, in tripropylene glycol (TPG) and a monohydroxy alcohol at 70° C. The mixture thus formed was added to 4,4'-diphenylmethane diisocyanate in a flask over which nitrogen gas was passed. Ice water was circulated around the flask to control the rapid increase in temperature observed, and the reaction continued, at 65° C., for three-and-one-half hours.

The amounts and equivalent percents of TMP, TPG, monohydroxy alcohol, and the amounts of MDI were as indicated in Table 1. The characteristics of the resulting liquid diphenylmethane diisocyanate Examples 1 through 9 were clear liquids while those of Examples 10 and 11 (both comparison examples) were hazy liquids.

TABLE I

| Components | Example #1 | | | | | | | | | | |
|---|---|---|---|---|---|---|---|---|---|---|---|
| | 1 | 2 | 3 | 4 | 5 | 6 | 7 | 8 | 9 | 10 | 11 |
| TMP, pbw | 78 | 52 | 60 | 60 | 60 | 60 | 60 | 78 | 150 | 8 | 8 |
| equivalent percent | 54 | 49 | 56 | 59 | 56 | 56 | 54 | 63 | 58 | 53 | 56 |
| TPG, pbw | 104 | 78 | 72 | 72 | 72 | 72 | 72 | 74.1 | 180 | 12 | 12 |
| equivalent percent | 34 | 34 | 31 | 33 | 31 | 31 | 30 | 28 | 33 | 38 | 40 |
| Cinnamyl Alcohol, pbw | 52 | 52 | 42 | 24 | — | — | — | 35 | 73.9 | 4 | 1 |
| equivalent percent | 12 | 17 | 13 | 8 | — | — | — | 9 | 9 | 9 | 3 |
| Propargyl Alcohol, pbw | — | — | — | — | — | — | 21.9 | — | — | — | — |
| equivalent percent | — | — | — | — | — | — | 16 | — | — | — | — |
| 3-phenyl-1-propanol, pbw | — | — | — | — | 42 | — | — | — | — | — | — |
| equivalent percent | — | — | — | — | 13 | — | — | — | — | — | — |
| 4-heptanol, pbw | — | — | — | — | — | 36.3 | — | — | — | — | — |
| equivalent percent | — | — | — | — | — | 13 | — | — | — | — | — |
| MDI, pbw | 1300 | 1300 | 1200 | 1200 | 1200 | 1200 | 1200 | 1200 | 3000 | 200 | 200 |
| Weight Ratio MDI: Mixture of TMP, TPG and Mono-alcohol | 5.6:1 | 7.1:1 | 6.9:1 | 7.7:1 | 6.9:1 | 7.1:1 | 7.8:1 | 6.4:1 | 7.4:1 | 8.3:1 | 9.5:1 |
| Product Characteristics | | | | | | | | | | | |
| Viscosity, cps at | 26500 24.2° C. | 1030 24.2° C. | 2600 25.5° C. | 1750 23.5° C. | 1800 26.4° C. | 2000 25° C. | 2800 23.5° C. | 1500 25.5° C. | 1650 24.5° C. | NOT TESTED | NOT TESTED |
| % NCO, actual | 19.7 | 23.05 | 22.06 | 22.93 | 22.11 | 22.28 | 22.4 | 20.8 | 22.6 | | |
| % NCO, calculated | 19.7 | 22.8 | 22 | 22.73 | 22.03 | 22.11 | 22.1 | 20.7 | 22.5 | | |

TABLE I-continued

| Components | Example #1 | | | | | | | | | | |
|---|---|---|---|---|---|---|---|---|---|---|---|
| | 1 | 2 | 3 | 4 | 5 | 6 | 7 | 8 | 9 | 10 | 11 |
| NCO Functionality | — | 2.06 | 2.085 | 2.097 | 2.085 | 2.085 | 2.078 | 2.119 | 2.094 | | |
| Freezing Point, °C. | 14 | 14 | 14 | 15 | 14 | 14 | 14 | 13 | 14 | | |

What is claimed is:

1. A liquid, diphenylmethane diisocyanate composition having an isocyanate functionality of greater than 2.0 and having an isocyanate group content of from about 20 to about 30 percent by weight prepared by reacting:
   (a) diphenylmethane diisocyanate with
   (b) a mixture of
      (i) from about 5 to about 20 equivalent percent of a monohydroxy alcohol,
      (ii) from about 25 to about 35 equivalent percent of a poly-1,2-propylene ether glycol having a molecular weight of from 134 to 700, and
      (iii) from about 45 to about 65 equivalent percent of a trihydroxy alcohol selected from the group consisting of trimethylolpropane, triethylolpropane, glycerine and 1,3,6-hexane triol,
      the total equivalent percent of (i), (ii) and (iii) being 100 parts,
   the weight ratio of (a) to (b) being from 5:1 to 15:1.

2. The composition of claim 1 having an isocyanate functionality of less than 2.20.

3. The composition of claim 1 having an isocyanate group content of from about 20 to about 25 percent by weight.

4. The composition of claim 1, wherein the weight ratio of (a) to (b) is from about 6:1 to about 10:1.

5. The composition of claim 1, wherein said monohydroxy alcohol has a molecular weight of from 32 to 270.

6. The composition of claim 5, wherein said monohydroxy alcohol is selected from the group consisting of cinnamyl alcohol, 3-phenyl-1-propanol, 4-heptanol, propargyl alcohol, 2-hydroxyethyl methacrylate and tert-butanol.

7. The composition of claim 1 wherein said trihydroxy alcohol is trimethylol propane.

* * * * *